April 23, 1935.   R. A. GOEPFRICH   1,998,669
BRAKE
Filed March 14, 1929

INVENTOR.
RUDOLPH A. GOEPFRICH
BY
ATTORNEYS.

Patented Apr. 23, 1935

1,998,669

UNITED STATES PATENT OFFICE 1,998,669

BRAKE

Rudolph A. Goepfrich, South Bend, Ind., assignor to Bendix Brake Company, South Bend, Ind., a corporation of Illinois Application March 14, 1929, Serial No. 346,863

13 Claims. (Cl. 188—79.5)

Figure 1:
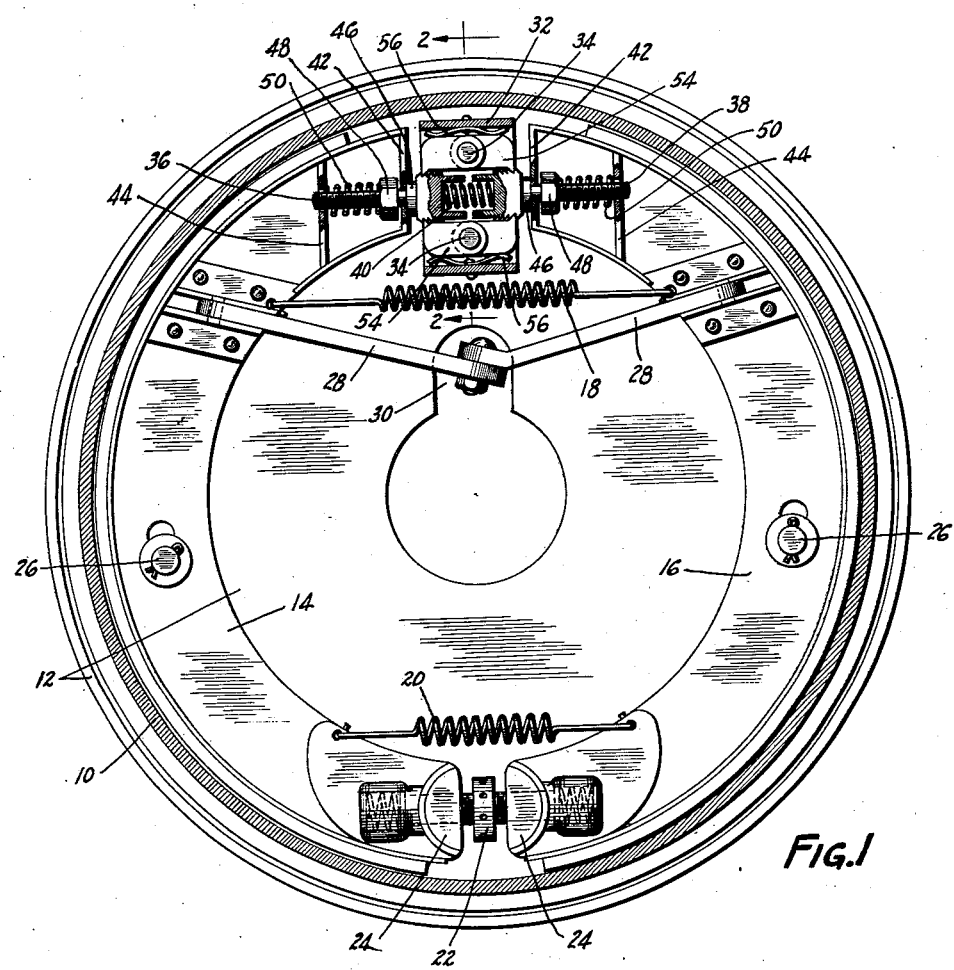
Figure 2:
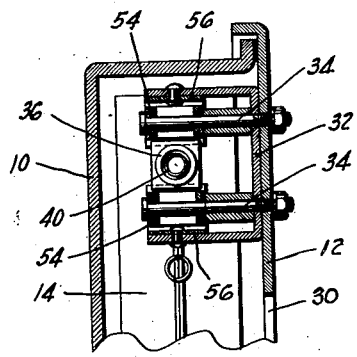

The invention relates to brakes, and is illustrated as embodied in an internal expanding automobile brake. An object of the invention is to provide simple and preferably automatically-actuated means for adjusting the brake for wear, for example by setting shiftable parts of the anchorage means. The anchorage means may have a housing or the like, containing torque-taking parts or plungers automatically shifted by the shoes or equivalent parts which anchor against them. Various features of novelty relate to the construction and arrangement of the plungers, and of the shoes, also to the structure and mounting of the pawls and their springs, as well as certain novel and desirable structural details which will be apparent from the following description of the illustrative embodiment shown in the accompanying drawing, in which:

Figure 1 is a vertical section through the brake, just inside the head of the brake drum, and showing, the brake shoes in side elevation; and Figure 2 is a partial section on the line 2—2 of Figure 1, showing the adjustable anchorage.

In the arrangement illustrated, the brake includes a rotatable drum 10, at the open side of which is a support such as a backing plate 12, and within which is the friction means of the brake, shown as comprising interchangeable shoes 14 and 16 connected by return springs 18 and 20. Shoe 14 anchors when the drum is turning clockwise, and shoe 16 anchors when the drum is turning counter-clockwise. The shoes may be connected by a right-and-left threaded thrust member 22 threaded into semi-cylindrical pivot blocks 24 sealed in correspondingly-shaped sockets in the ends of the shoes. The shoes may have any suitable steady-rests 26, and are shown applied by means such as a horizontal toggle 28 operated by a tension element passing through an opening 30 in the backing plate.

Between the upper, or anchored, ends of the shoes is a support such as a stamped steel housing 32, secured to the backing plate by means such as upper and lower pivot pins 34. Centrally of the housing are alined oppositely-extending plungers 36 and 38, having their adjacent ends cupped and with a spring 40 compressed between them. Plungers 36 and 38 project through flanges 42 and 44 on the shoes, and take the torque of the shoes from flanges 42, which engage collars or abutments 46 on the plungers. The ends of the plungers are threaded to receive nuts 48 forming abutments on the opposite sides of flanges 42. Springs 50 may be compressed between nuts 48 and flanges 44.

Nuts 48 are adjusted to provide for a short predetermined movement of the shoes in a brake-applying direction before the nuts 48 engage the flanges 42. When the nuts 48 engage the flanges 42 further movement withdraws the plungers 36 and 38 to compensate for wear of the brake. Between the cupped ends of the plungers 36 and 38 the abutments 46 are ratchet portions having teeth engaged by pawls 54 pivoted on the pins 34, which prevent any inward movement of the plungers. The pawls are controlled by leaf springs 56 compressed between the pawls and the housing 32.

While one illustrative embodiment has been described in detail, it is not my intention to limit the scope of the invention to that particular embodiment, or otherwise than by the terms of the appended claims.

I claim:

1. A brake anchorage comprising, in combination, a housing, torque-taking plungers supported thereby, ratchets on the plungers, said plungers having torque-taking abutments and operating abutments spaced therefrom, and pawls in said housing and engaging each of the ratchets.

2. A brake anchorage comprising, in combination, a housing, torque-taking plungers supported thereby, ratchets on the plungers, said plungers having torque-taking abutments and operating abutments spaced therefrom, a spring compressed between the plungers and urging them apart, and pawls in said housing and engaging each of the ratchets.

3. A brake anchorage comprising, in combination, a housing, torque-taking plungers positioned therein, ratchets on the plungers, said plungers having torque-taking abutments and operating abutments spaced therefrom, pawls in said housing engaging each of the ratchets, and pivots carried by the housing and on which the pawls are mounted.

4. A brake anchorage comprising, in combination, a housing, torque-taking plungers therein, ratchets on the plungers, said plungers having torque-taking abutments and operating abutments spaced therefrom, pawls in said housing engaging both of the ratchets, and springs carried by the housing and urging the pawls against said ratchets.

5. A plunger having one end cupped and with a nut threaded on its other end and having ratchet teeth between the nut and the cupped end.

6. A brake backing plate having a housing secured thereto by fixed pins, and pawls pivotally mounted on said pins.

7. A brake backing plate having a housing secured thereto by fixed pins, pawls pivotally mounted on said pins, and leaf springs compressed between the pawls and the housing.

8. A brake comprising a backing plate, a housing positioned thereon, alined plungers within the housing, a compression member between the plungers, spaced stops on the plungers and means in the housing restricting the plungers against movement toward each other.

9. A brake comprising friction elements having separable ends, plungers positioned for reciprocation in the respective ends, means limiting the movement of the plungers, a compression member between the plungers and means restricting the plungers against movement toward each other.

10. A brake comprising a friction element having separable ends, a plunger positioned in each end, means for limiting the movement of the plungers, a compression member positioned between the plungers and a fixed means restricting movement of the plungers toward each other.

11. A brake comprising a friction element having separable ends, a plunger positioned for reciprocation in the respective ends, spaced stops for limiting the movement of the plungers, compression members for actuating the plungers toward each other, a compression member positioned between the plungers and spring pressed members restricting the movement of the plungers toward each other.

12. A brake comprising a drum, a floating friction shoe having spreadable ends, a single anchorage for said ends located therebetween, and automatic adjustment means in said anchor and operable by movement of either of said ends for increasing the width thereof with increased spreading of the shoe ends due to wear.

13. A brake comprising a drum, floating friction means having spreadable ends, a single anchor therebetween, and automatic adjustment means in said anchor and associated with said ends for increasing the effective width of said anchor by the movement of either of said ends.

RUDOLPH A. GOEPFRICH.